(12) United States Patent
Llavona-Serrano et al.

(10) Patent No.: US 11,512,405 B2
(45) Date of Patent: Nov. 29, 2022

(54) METAL OR METAL ALLOY DEPOSITION COMPOSITION AND PLATING COMPOUND

(71) Applicant: Atotech Deutschland GmbH, Berlin (DE)

(72) Inventors: Angela Llavona-Serrano, Berlin (DE); Timo Bangerter, Berlin (DE); Olivier Mann, Berlin (DE); Pamela Cebulla, Berlin (DE); Stefanie Ackermann, Berlin (DE); Heiko Brunner, Berlin (DE); Kinga Haubner, Berlin (DE); Bernd Froese, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 0 days.

(21) Appl. No.: 16/961,940

(22) PCT Filed: Dec. 14, 2018

(86) PCT No.: PCT/EP2018/084971
§ 371 (c)(1),
(2) Date: Jul. 14, 2020

(87) PCT Pub. No.: WO2019/141451
PCT Pub. Date: Jul. 25, 2019

(65) Prior Publication Data
US 2020/0340132 A1 Oct. 29, 2020

(30) Foreign Application Priority Data

Jan. 16, 2018 (EP) .................... 18151803

(51) Int. Cl.
| | |
|---|---|
| C25D 3/38 | (2006.01) |
| C25D 3/58 | (2006.01) |
| C08G 73/06 | (2006.01) |
| C25D 9/02 | (2006.01) |

(52) U.S. Cl.
CPC ........... C25D 3/38 (2013.01); C08G 73/0616 (2013.01); C25D 3/58 (2013.01); C25D 9/02 (2013.01)

(58) Field of Classification Search
None
See application file for complete search history.

(56) References Cited

U.S. PATENT DOCUMENTS

| | | |
|---|---|---|
| 5,976,341 A | 11/1999 | Schumacher et al. |
| 6,099,711 A | 8/2000 | Dahms et al. |
| 6,610,192 B1 | 8/2003 | Step et al. |
| 2009/0139873 A1 | 6/2009 | Wang et al. |
| 2011/0263810 A1 | 10/2011 | Siemer et al. |
| 2013/0068626 A1 | 3/2013 | Siemer et al. |
| 2016/0255729 A1* | 9/2016 | Duan ...................... C25D 5/56 205/125 |

FOREIGN PATENT DOCUMENTS

| | | |
|---|---|---|
| DE | 102011116764 A1 | 4/2013 |
| EP | 2392692 A1 | 12/2011 |

OTHER PUBLICATIONS

PCT/EP2018/084971; PCT International Search Report and Written Opinion of the International Searching Authority dated Jan. 21, 2019.
Hai et al.; "Copolymers of Imidazole and 1,4-Butandiol Diglycidyl Ether as an Efficient Suppressor Additive for Copper Electroplating", Journal of the Electrochemical Society, vol. 161, No. 9, May 22, 2014, pp. D381-D387.

* cited by examiner

*Primary Examiner* — Wojciech Haske
(74) *Attorney, Agent, or Firm* — Renner, Otto, Boisselle & Sklar, LLP

(57) ABSTRACT

The present invention concerns a metal or metal alloy deposition composition, particularly a copper or copper alloy deposition composition, for electrolytic deposition of a metal or metal alloy layer, particularly for electrolytic deposition of a copper or copper alloy layer, comprising at least one type of metal ions to be deposited, preferably copper ions, and at least one imidazole based plating compound. The present invention further concerns a method for preparation of the plating compound, the plating compound itself and its use in a metal or metal alloy deposition composition. The inventive metal or metal alloy deposition composition can be preferably used for filling recessed structures, in particular those having higher diameter to depth aspect ratios.

14 Claims, No Drawings

METAL OR METAL ALLOY DEPOSITION COMPOSITION AND PLATING COMPOUND

The present application is a U.S. National Stage Application based on and claiming benefit and priority under 35 U.S.C. § 371 of International Application No. PCT/EP2018/084971, filed 14 Dec. 2018, which in turn claims benefit of and priority to European Application No. 18151803.6 filed 16 Jan. 2018, the entirety of both of which is hereby incorporated herein by reference.

FIELD OF THE INVENTION

The present invention concerns a metal or metal alloy deposition composition, particularly a copper or copper alloy deposition composition, for electrolytic deposition of a metal or metal alloy layer, particularly of a copper or copper alloy layer and a method for electrolytic deposition of a metal or metal alloy layer, particularly of a copper or copper alloy layer, on at least one surface of a substrate.

The present invention further relates to a plating compound for use in said metal or metal alloy deposition composition and the use of said plating compound, preferably to deposit a metal or metal alloy layer. The metal or metal alloy deposition composition is particularly preferably a copper or copper alloy deposition composition. The present invention further concerns a method for preparation of the plating compound.

BACKGROUND OF THE INVENTION

Imidazole containing compounds are known in the art and have been used for many industrial purposes. WO 2010/072571 A1 discloses a synthesis of polymeric imidazole compounds. Said synthesis includes the reaction of an α-dicarbonyl compound, an aldehyde, an amino compound having at least two amino moieties and an acid. The thus formed polymeric imidazole compounds may be used as dispersant.

Imidazole based compounds are also used in the field of metal deposition. One particular field is the electrolytic deposition of copper which is of paramount interest in the electronics industry, e.g. when small features have to be filled. Imidazole based compounds have been reported for electrolytic copper plating in WO 2011/151785 A1.

U.S. Pat. No. 6,610,192 B1 discloses levelers formed by a reaction of a heterocyclic amine such as imidazole and epihalohydrin to be used in electroplating processes of copper for filling small apertures.

Still today, there is a necessity for improvement of such electrolytic copper plating methods. Many acidic copper or copper alloy deposition compositions of the prior art are not suitable to fulfil the current and future requirements in manufacture of advanced printed circuit boards, IC substrates and metallization of semiconducting and glass substrates. Depending on the circuitry layout, blind micro vias (BMV) in printed circuit boards and IC substrates need to be filled with copper not only conformally but completely. Typical requirements for BMV filling are for example: obtaining a completely filled BMV while depositing no more than 12 to 18 μm of copper onto the neighboring planar substrate areas and at the same time producing a dimple as small as possible on the outer surface of the filled BMV.

Many known metallization methods fail to deliver sufficient results when for example recessed structures, in particular BMVs, having a depth to diameter aspect ratio of 0.5 or greater are to be filled with copper and in particular when no more than 12 μm of copper are to formed onto the neighboring planar substrate areas of such recessed structures. This, however, is a typical requirement in today's electronic industry for the manufacturing of printed circuit boards in general and in particular in the production of high density interconnect (HDI) printed circuit boards.

In metallization of semiconducting wafers, TSV filling must lead to a complete and void-free filling with copper while creating no more than ⅕ of via diameter of overplated copper onto the neighboring planar areas. Similar requirements are demanded for filling through glass vias with copper.

OBJECTIVE OF THE PRESENT INVENTION

It is therefore an objective of the present invention to overcome the shortcomings of the prior art.

It is a further objective of the present invention to provide a metal or metal alloy deposition composition, preferably a copper or copper alloy deposition composition, which is capable of filling recessed structures resulting in dimples of the formed metal or metal alloy layer, preferably the copper or copper alloy layer, with reduced size compared to those obtained from the methods and plating baths known in the prior art. This applies in particular to recessed structures having an depth to diameter aspect ratio of 0.6 or greater, much preferred recessed structures having such aspect ratios of 0.6 to 1.0.

SUMMARY OF THE INVENTION

The objectives are solved by the inventive metal or metal alloy deposition composition, particularly the inventive copper or copper alloy deposition composition, for electrolytic deposition of a metal or metal alloy layer, particularly of a copper or copper alloy layer, comprising
 a) at least one type of metal ions to be deposited, preferably copper ions,
 b) at least one plating compound comprising at least one structural unit represented by formula (1)

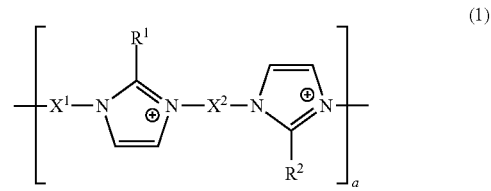

wherein
each $R^1$ and $R^2$ are independently selected from the group consisting of hydrogen and alkyl group;
each $X^1$ and $X^2$ are independently selected from the group consisting of
 a structural unit represented by formula (X-1)

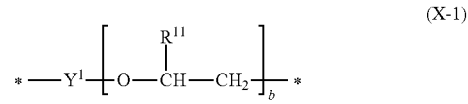

wherein
Y¹ is an alkanediyl group;
each R¹¹ is independently selected from the group consisting of hydrogen, alkyl group, aryl group and alkaryl group;
b is an integer ranging from 1 to 10;
and
a structural unit represented by formula (X-2)

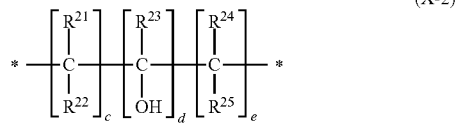

wherein
$R_{21}$, $R^{22}$, $R^{23}$, $R^{24}$ and $R^{25}$ are independently selected from the group consisting of hydrogen, alkyl group, aryl group and alkaryl group;
c is an integer selected from 1, 2, 3, 4, 5 and 6;
d is an integer selected from 1 and 2;
e is an integer selected from 1, 2, 3, 4, 5 and 6;
with the proviso that at least one of $X^1$ and $X^2$ is a structural unit represented by formula (X-1);
and a is an integer ranging from 1 to 10.

Above objectives are further solved by the method for electrolytic deposition of a metal or metal alloy layer, particularly of a copper or copper alloy layer, on at least one surface of a substrate comprising the steps (i) providing the substrate having the at least one surface;
(ii) contacting the at least one surface of the substrate with a metal or metal alloy deposition composition according to the invention;
(iii) applying an electrical current between the substrate and at least one anode; and thereby depositing a metal or metal alloy layer on the at least one surface of the substrate.

Above objectives are also solved by the plating compound for use in a metal or metal alloy deposition composition, particularly in a copper or copper alloy deposition composition, for electrolytic deposition, characterized in that the plating compound is as defined above.

Above objectives are further solved by the use of the inventive plating compound in a metal or metal alloy deposition composition, particularly in a copper or copper alloy deposition composition, for electrolytic deposition of a metal or metal alloy layer, particularly preferably for electrolytic deposition of a copper or copper alloy layer.

Advantageously, the present invention allows the complete and void-free filling of recessed structures. This includes those recessed structures having preferred diameter to depth aspect ratios of 0.6 or greater but also of those having such aspect ratios below, e.g. of 0.4 to 0.59.

Further advantageously, it is also possible with the present invention to completely fill recessed structures having relatively large diameters without voids and with reduced occurrence of dimples in the of the formed metal or metal alloy layer (compared to the prior art). Recessed structures with relatively large diameters include those having a diameter of 100 μm or greater or even those of 125 μm or greater.

Also, deep recessed structure can be completely filled without voids and with reduced occurrence of dimples in the deposits (compared to the prior art). This includes those recessed structures having a depth of 50 μm or greater, or even those having a depth of 75 μm or greater.

DETAILED DESCRIPTION OF THE INVENTION

Percentages throughout this specification are weight-percentages (wt.-%) unless stated other-wise. Concentrations given in this specification refer to the volume or mass of the entire solutions/compositions unless stated otherwise. The terms "deposition" and "plating" are used interchangeably herein. Also, "layer" and "deposit" are also used synonymously in this specification. The terms "deposition composition" and "plating bath" are synonymous in the context of the present invention. The terms "substitution" and "functionalization" are used interchangeably in this specification. An "electrolytic metal or metal alloy deposition composition" is herein understood as a composition suitable to be used for electrolytic deposition of a metal or a metal alloy.

The term "alkyl group" according to the present invention comprises branched or unbranched alkyl groups comprising cyclic and/or non-cyclic structural elements, wherein cyclic structural elements of the alkyl groups naturally require at least three carbon atoms. C1-CX-alkyl group in this specification and in the claims refers to alkyl groups having 1 to X carbon atoms (X being an integer). C1-C8-alkyl group for example includes, among others, methyl, ethyl, n-propyl, iso-propyl, n-butyl, iso-butyl, sec-butyl, tert-butyl, n-pentyl, iso-pentyl, sec-pentyl, tert-pentyl, neo-pentyl, hexyl, heptyl and octyl. Substituted alkyl groups may theoretically be obtained by replacing at least one hydrogen by a functional group. Unless stated otherwise, alkyl groups are preferably selected from substituted or unsubstituted C1-C8-alkyl groups, more preferably from substituted or unsubstituted C1-C4-alkyl groups because of their improved solubility in water.

The term "aryl group" according to the present invention refers to ring-shaped aromatic hydro-carbon residues, for example phenyl or naphthyl where individual ring carbon atoms can be replaced by nitrogen, oxygen and/or sulfur atoms, for example benzothiazolyl. Furthermore, aryl groups are optionally substituted by replacing a hydrogen atom in each case by a functional group. The term C5-CX-aryl group refers to aryl groups having 5 to X carbon atoms (optionally replaced by nitrogen, oxygen and/or sulfur atoms and X being an integer and the sum of all carbon atoms and its optional replacements) in the ring-shaped aromatic group. Unless stated otherwise, aryl group are preferably selected from substituted or unsubstituted C5-C10-aryl groups, more preferably from substituted or unsubstituted C5-C6-aryl groups because of their improved solubility in water. Usually, a C5-aryl group requires the replacement of at least one carbon atom for a heteroatom capable of donating electrons such as nitrogen, sulfur or oxygen. An example for a such a C5-aryl group is imidizolyl.

The term "alkanediyl group" is the corresponding derivative of an alkyl group having two bonding sites. Sometimes alkanediyl groups are referred to as alkylene groups in the art. C1-CX-alkanediyl group in this specification (X being an integer) and in the claims refers to alkanediyl groups having 1 to X carbon atoms, e.g. 1 to 12 or 2 to 4. The explanations and preferences outlined for alkyl groups apply to alkanediyl groups as well.

The term "alkaryl group" according to the present invention refers to a combination of an alkyl group and an aryl group such as tolyl and benzyl. The group may be attached by the corresponding alkyl moiety (e.g. benzyl: *—CH$_2$—C$_6$H$_5$) or the aryl moiety (e.g. tolyl: *—C$_6$H$_4$—CH$_3$) thereof.

Unless stated otherwise, above-defined groups are substituted or unsubstituted. Functional groups as substituents are preferably selected from the group consisting of oxo (=O), hydroxyl (—OH), amino (—NH$_2$), carbonyl (—CHO) and carboxyl (—CO$_2$H) to improve the solubility of the relevant compounds in polar solvents such as water, more preferably hydroxyl to improve the solubility of the relevant compounds in above solvents and to avoid any potential undesired side-reactions during synthesis. In one embodiment of the present invention, the groups are preferably unsubstituted unless stated otherwise hereinafter. Oxo is not to be mistaken for oxy (—O—) which is usually an oxygen atom of an ether moiety (and thus placed between two carbon atoms).

If more than one substituent (such as a structural unit, residue or a moiety) is to be selected from a certain group, each substituent is selected independently from each other unless stated otherwise herein. Residues/moieties/integers of the same name (e.g. R$^1$, R$^2$, (X-1) etc.) have the same meaning within this invention even if bonded in different structural entities.

The embodiments described hereinafter can be combined without restraints unless this is technically not feasible or specifically excluded. Bonding sites in various chemical formulae are highlighted as asterisks. Preferred embodiments described for one aspect of the present invention are applicable mutatis mutandis to all the other aspects of the present invention unless stated otherwise herein.

Preferred embodiments of the present invention which have been found to be particularly useful in fulfilling above described objectives underlying the present invention are described in the dependent claims and hereinafter. These preferred embodiments of the present invention inter alia proved particularly useful were when applying the at least one plating compound comprising at least one structural unit represented by formula (1) as additives in a metal or metal alloy deposition composition, preferably in a copper or copper alloy deposition composition.

The inventive metal or metal alloy deposition composition comprises at least one plating compound comprising at least one structural unit represented by formula (1). The at least one plating compound comprising at least one structural unit represented by formula (1) is hereinafter referred to as "plating compound".

According to the invention, the plating compound comprises X$^1$ and X$^2$ which are selected to be the same or to be different from a structural unit represented by formula (X-1) and a structural unit represented by formula (X-2) with the proviso that at least one of X$^1$ and X$^2$ is a structural unit represented by formula (X-1).

It is preferred that at least 45%, more preferably at least 50%, even more preferably at least 60%, of all of X$^1$ and X$^2$ in the plating compound are structural units represented by formula (X-1). In a much preferred embodiment of the invention, X$^1$ and X$^2$ are both structural units represented by formula (X-1). Surprisingly, this allows for strongly enhanced plating results (compare application examples for plating compounds A and B versus plating compound E in the example section).

Preferably, X$^1$ and X$^2$ are structurally different to allow for enhanced plating results such as reduced dimples. Structurally different in this context means, that at least one of Y$^1$, R$^{11}$ and b is different in X$^1$ and X$^2$.

In one embodiment of the present invention, X$^1$ or X$^2$ is a structural unit represented by formula (X-1) and the other one (of X$^1$ and X$^2$ which is not a structural unit represented by formula (X-1)) is a structural unit represented by formula (X-2). For example, X$^1$ is structural unit represented by formula (X-1) and X$^2$ is a structural unit represented by formula (X-2).

In cases where both X$^1$ and X$^2$ are selected to be structural units represented by formula (X-2), the plating results become severely worsened (see comparative results).

Preferably, R$^1$ and R$^2$ are independently selected from the group consisting of hydrogen and C1-C4-alkyl group, more preferably from hydrogen and C1-C2-alkyl group (i.e. methyl group and ethyl group). Preferably, R$^1$ and R$^2$ are the same for the ease of synthesis.

In formula (1), a is an integer. Integer a ranges from 1 to 8; a preferably ranges from 2 to 7; more preferably, a ranges from 2 to 6.

Preferably, Y$^1$ is a C1-C12-alkanediyl group, Y$^1$ is more preferably a C2-C6-alkanediyl group; Y$^1$ is even more preferably a C2-C4-alkanediyl group; Y$^1$ is yet even more preferably 1,2-ethandiyl or 1,3-propanediyl.

Preferably, R$^{11}$ is selected from the group consisting of hydrogen, C1-C4-alkyl group and phenyl group; R$^{11}$ is more preferably selected from the group consisting of hydrogen and C1-C2-alkyl group; R$^{11}$ is even more preferably selected from the group consisting of hydrogen and methyl group; most preferably, R$^{11}$ is hydrogen.

Preferably, integer b ranges from 1 to 6; b ranges more preferably from 1 to 5; b ranges even more preferably from 2 to 5.

Preferably, R$^{21}$, R$^{22}$, R$^{23}$, R$^{24}$ and R$^{25}$ are independently selected from the group consisting of hydrogen and C1-C4-alkyl group; more preferably, R$^{21}$, R$^{22}$, R$^{23}$, R$^{24}$ and R$^{25}$ are independently selected from the group consisting of hydrogen and C1-C2-alkyl group; even more preferably, R$^{21}$, R$^{22}$, R$^{23}$, R$^{24}$ and R$^{25}$ are selected from the group consisting of hydrogen and methyl group; most preferably R$^{21}$, R$^{22}$, R$^{23}$, R$^{24}$ and R$^{25}$ are hydrogen.

Preferably, integer c is selected from 1, 2 and 3; c is more preferably selected from 1 and 2; even more preferably, c is 1.

In case, integer d is 2, both carbon atoms bearing the hydroxyl group are preferably adjacent, thus forming a vicinal diol. Preferably, d is 1.

Preferably, integer e is selected from 1, 2, and 3; e is more preferably selected from 1 and 2; even more preferably, e is 1.

The plating compound optionally comprises at least one capping group attached to the structural unit represented by formula (1). Useful capping groups are preferably selected from hydrogen, alkyl group, aryl group (in particular substituted and unsubstituted imidazole such as

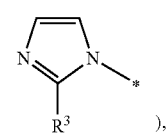

), alkaryl group, and

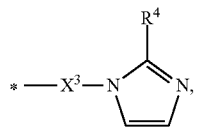

wherein R³ is selected from the group consisting of hydrogen and alkyl group; R⁴ is selected from the group consisting of hydrogen and alkyl group; and X³ is selected from the group consisting of a structural unit represented by formula (X-1) and a structural unit represented by formula (X-2). The capping groups may exemplarily be bonded to a suitable X¹ and/or a suitable nitrogen atom of the imidazolium moiety having the free bonding site in the structural unit represented by formula (1).

Exemplarily, the plating compound may be represented by formula (1a) wherein CG¹ and CG² are capping groups independently selected from above groups:

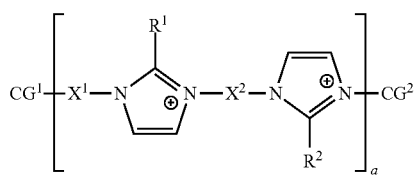

Preferably, X³ is a structural unit represented by formula (X-1). R³ is preferably selected from the group consisting of hydrogen and C1-C4-alkyl group, more preferably from hydrogen and C1-C2-alkyl group (i.e. methyl group and ethyl group); R⁴ is preferably selected from the group consisting of hydrogen and C1-C4-alkyl group, more preferably from hydrogen and C1-C2-alkyl group (i.e. methyl group and ethyl group). In one embodiment of the present invention, all of R¹, R², R³ and R⁴ are selected to be the same for the ease of synthesis.

Preferably, said capping groups are selected from the group consisting of

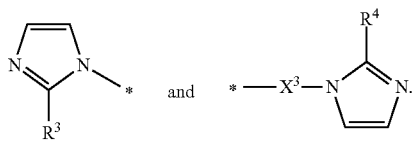

It was surprisingly found by the inventors that these capping groups improve the results of the deposition of a metal or metal alloy layer, particularly of a copper or copper alloy layer, e.g. when filling recessed structures having above-described aspect ratios. In one embodiment of the present invention, the plating compound is represented by formula (2)

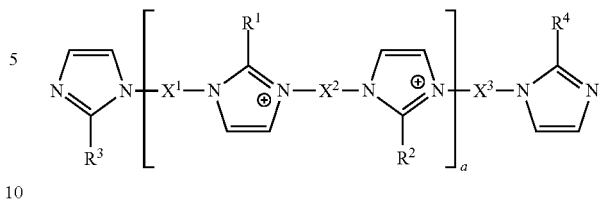

wherein R³ and R⁴ are independently selected from the group consisting of hydrogen and alkyl group; and X³ I s selected from the group consisting of the structural unit represented by formula (X-1) and the structural unit represented by formula (X-2).

The plating compound is cationic and thus a counterion is usually present. Any anion may be used as counterion. Such counterion is preferably selected from the group consisting of hydroxide; hydrogensulfate; sulfate; alkylsulfonate such as methanesulfonate (also known as mesylate), triflate, nonaflate; arylsulfonate such as toluenesulfonate; carboxylate such as acetate; halide such as chloride, bromide, iodide; and methanesulfate ($CH_3—O—SO_3^-$). More preferably, said counterion is selected from the group consisting of alkylsulfonate; arylsulfonate and halide. Typically, above counterions are used in quantities sufficient to neutralize the cationic charges of the plating compound in order to satisfy the underlying electroneutrality requirement. In one embodiment of the present invention, the weight average molecular weight (Mw) of the plating compound ranges from 200 to 10000 g/mol, preferably from 400 to 5000 g/mol, more preferably from 600 to 3000 g/mol, even more preferably from 1100 to 2200 g/mol and still even more preferably from 1100 to 1500 g/mol. The weight average molecular weight can be determined by gel permeation chromatography.

The plating compound is used in a metal or metal alloy deposition composition, particularly in a copper or copper alloy deposition composition, preferably for electrolytic deposition of levelled metal or metal alloy layers, and particularly preferably for electrolytic deposition of levelled copper or copper alloy layers. The plating compound thus acts as leveler. The leveling function and the term "leveler" means the following: Using the metal or metal alloy deposition composition, preferably the copper or copper alloy deposition composition, according to the invention, and the method according to the invention, it is possible to deposit a metal or metal alloy layer such as a copper layer in a very uniform manner in the structures to be filled, such as recessions and depressions. In particular, it is possible to fill recessions and depressions totally, reduce a deposition of metal or metal alloy, in particular of copper or copper alloy, on the surface compared to deposition in the depressions/recessions, and to avoid or at least minimize any voids or dimples. This guarantees that an extensively smooth and even metal or metal alloy surface, in particular an extensively smooth and even copper or copper alloy surface, is formed that exhibits practically no deformations or at least less deformations compared methods and deposition compositions of the prior art.

Further to the plating compound, the inventive metal or metal alloy deposition composition comprises at least one type of metal ions to be deposited. The metal ions to be deposited are reducible to their respective metallic state, typically, under the conditions given by electrolytic plating. The metal ions to be deposited are understood in the context of the present invention as those metal ions which can be deposited to form a metallic layer or a metal alloy layer (under the given conditions). In the context of the present invention, reducible metal ions are preferably selected from the group consisting of gold ions, tin ions, silver ions, zinc ions, nickel ions, cobalt ions, palladium ions and copper ions. Suitable sources of said ions are water-soluble salts and/or water-soluble complexes of said metals. Non-reducible metal ions include inter alia alkaline and earth alkaline metal ions which cannot be reduced under the conditions typically applied in metal or metal alloy deposition compositions.

If only one type of metal ions to be deposited is present in the inventive metal or metal alloy deposition composition only this metal will be deposited when using the composition. If two or more types of reducible metal ions are present therein an alloy will be deposited.

The inventive metal or metal alloy deposition composition is preferably an aqueous solution. The term "aqueous solution" means that the prevailing liquid medium, which is the solvent in the metal or metal alloy deposition composition, is water. Further liquids miscible with water, as for example alcohols and other polar organic liquids, may be added.

Other components may be contained in the metal or metal alloy deposition composition such as pH adjustors (acids, bases, and buffers), complexing agents (also referred to as chelating agents), stabilizing agents, wetting agents and the like. These components and suitable concentration thereof are known in the art.

The metal or metal alloy deposition composition according to the invention may be prepared by dissolving all components in the liquid medium, preferably in water.

In a preferred embodiment of the present invention, the at least one type of reducible metal ions are copper ions. Such a composition will be herein referred to as "copper or copper alloy deposition composition". The term "copper or copper alloy deposition composition" is synonymous herein to "copper plating bath". Said copper or copper alloy deposition composition is particularly suitable for electroplating of copper; it is thus preferably an electrolytic copper or copper alloy deposition composition (also referred to in the art as "copper electroplating bath" or "electrolytic copper plating bath"). Typically, the inventive copper or copper alloy deposition composition is suitable for filling of recessed structures and dual damascene applications.

In a preferred embodiment of the present invention, the metal or metal alloy deposition composition is a pure copper deposition composition, wherein pure copper means 99 wt.-% or more of all reducible metal ions in the inventive copper deposition composition ions are copper ions. More preferably, the inventive copper deposition composition is free of further reducible metal ions other than copper ions (disregarding traces of impurities commonly present in technical raw materials and typically employed redox couples such as $Fe^{3+}/Fe^{2+}$, i.e. less than 1.0 wt.-% or preferably 0.1 wt.-% of such further reducible metal ions in relation to the copper ions). Preferably, the copper deposition composition is free of intentionally added zinc ions. Co-deposition of zinc and copper occasionally reduces the electrical conductivity of the formed deposits significantly compared to pure copper rendering such co-deposits of zinc and copper unsuitable for the use in the electronics industry and should therefore be avoided. Further, it is preferably free of tin ions for the same reasons outlined for zinc ions.

The concentration of the at least one plating compound according to the invention, preferably in the inventive copper or copper alloy deposition composition, preferably ranges from 0.1 to 1000 mg/L, more preferably from 1 to 500 mg/L, even more preferably 2 mg/L to 300 mg/L, yet even more preferably from 5 mg/L to 100 mg/L and most preferably from 10 mg/L to 50 mg/. If more than one plating compound is used, the overall concentration of all plating compounds used is preferably in above-defined ranges.

The copper ion concentration in the copper or copper alloy deposition composition preferably ranges from 0.1 to 300 g/L and more preferably from 1 g/L to 70 g/L.

Copper ions are preferably included in the copper or copper alloy deposition composition by using one or more of the following copper ion sources: copper sulfate, copper alkyl sulfonates such as copper methane sulfonate, copper aryl-sulfonates such as copper p-toluene sulfonate and copper phenyl sulfonate, copper halides such as copper chloride, copper acetate, copper citrate, copper fluoroborate, copper oxide, copper carbonate and mixtures of the aforementioned. More preferably, copper sulfate, copper alkyl-sulfonates or mixtures of the aforementioned are used as the copper ion source.

The copper or copper alloy deposition composition further preferably comprises at least one acid. Said at least one acid is preferably selected from the group consisting of sulfuric acid, fluoroboric acid, phosphoric acid and methane sulfonic acid and mixtures of the aforementioned. The at least one acid is preferably contained in the copper or copper alloy deposition composition in a concentration of 1 g/L to 400 g/L, more preferably from 5 g/L to 250 g/L.

The copper or copper alloy deposition composition preferably has a pH value of 3, more preferably ≤2, even more preferably of ≤1.5, yet even more preferably of ≤1.

The copper or copper alloy deposition composition optionally comprises at least one accelerator (also referred to as brightener in the art). Such accelerators are known in the art. The at least one accelerator is preferably selected from the group consisting of organic thiol-, sulfide-, disulfide- and polysulfide-compounds. More preferably, accelerator-brightener additives are selected from the group consisting of 3-(benzthiazolyl-2-thio)-propylsulfonic-acid, 3-mercaptopropan-1-sulfonic acid, ethylendithiodipropylsulfonic-acid, bis-(p-sulfophenyl)-disulfide, bis-(ω-sulfobutyl)-disulfide, bis-(ω-sulfohydroxypropyl)-disulfide, bis-(ω-sulfopropyl)-disulfide, bis-(ω-sulfopropyl)-sulfide, methyl-(ω-sulfopropyl)-disulfide, methyl-(ω-sulfopropyl)-trisulfide, O-ethyl-dithiocarbonic-acid-S-(ω-sulfopropyl)-ester, thioglycolic acid, thiophosphoric-acid-O-ethyl-bis-(ω-sulfopropyl)-ester, 3-N,N-dimethylaminodithiocarbamoyl-1-propanesulfonic acid, 3,3'-thiobis(1-propanesulfonic acid), thiophosphoric-acid-tris-(ω-sulfopropyl)-ester and their corresponding salts. The concentration of all accelerators optionally present in the copper bath compositions preferably ranges from 0.01 mg/L to 100 mg/L, more preferably from 0.05 mg/L to 50 mg/L.

The copper or copper alloy deposition composition optionally comprises at least one suppressor (also referred to as carrier in the art). Such suppressors are known in the art. Preferably, the at least one suppressor is selected from the group consisting of polyvinylalcohol, carboxymethylcellulose, polyethylenglycol, polypropylenglycol, stearic acid polyglycolester, alkoxylated naphthols, oleic acid polyglycolester, stearylalcoholpolyglycolether, nonylphenolpolyglycolether, octanolpolyalkyleneglycolether, octanediol-bis-(polyalkyleneglycolether), poly(ethyleneglycol-ran-propyleneglycol), poly(ethyleneglycol)-block-poly(propyleneglycol)-block-poly(ethyleneglycol), and poly(propyleneglycol)-block-poly(ethyleneglycol)-block-poly(propyleneglycol). More preferably, the optional carrier-suppressor additive is selected from the group consisting of polyethylene glycol, polypropylene glycol, poly(ethyleneglycol-ran-propyleneglycol), poly(ethylenglycol)-block-poly(propyleneglycol)-block-poly(ethylenglycol) and poly(propyleneglycol)-block-poly(ethyleneglycol)-block-poly(propylenglycol). The concentration of said optional suppressor in the copper or copper alloy deposition composition preferably ranges from 0.005 g/L to 20 g/L, more preferably from 0.01 g/L to 5 g/L.

Optionally, the aqueous copper or copper alloy deposition composition comprises in addition to the inventive plating compound at least one further leveler. As described hereinbefore, the plating compounds acts as leveler in a metal or metal alloy deposition composition and in a copper or copper alloy deposition composition. The at least one further leveler is preferably selected from the group consisting of nitrogen containing organic compounds such as polyethyleneimine, alkoxylated polyethyleneimine, alkoxylated lactams and polymers thereof, diethylenetriamine and hexamethylenetetramine, polyethyleneimine bearing peptides, polyethyleneimine bearing amino acids, polyvinylalcohol bearing peptides, polyvinylalcohol bearing amino acids, polyalkyleneglycol bearing peptides, polyalkyleneglycol bearing amino acids, aminoalkylene bearing pyrroles and aminoalkylene bearing pyridines, ureyl polymers, organic dyes such as Janus Green B, Bismarck Brown Y and Acid Violet 7, sulfur containing amino acids such as cysteine, phenazinium salts and derivatives thereof. The preferred further leveler is selected from nitrogen containing organic plating compounds. Said optional further leveler is preferably contained in the copper or copper alloy deposition composition in amounts of 0.1 mg/L to 100 mg/L.

The copper or copper alloy deposition composition optionally further comprises halide ions, preferably chloride ions. Preferably, the concentration of the halide ions ranges from 20 mg/L to 200 mg/L, more preferably from 30 mg/L to 60 mg/L. Suitable sources for halide ions are ionic compounds that are able to liberate halide ions in the composition such as for example hydrochloric acid or alkali halides like sodium chloride.

Optionally, the copper or copper alloy deposition composition comprises at least one wetting agent. These wetting agents are also referred to as surfactants in the art. The at least one wetting agent may be selected from the group of non-ionic, cationic, anionic and/or amphoteric surfactants and is used in concentration from 0.01 to 5 wt.-%.

In one embodiment of the present invention, a redox couple, such as $Fe^{2+/3+}$ ions is comprised in the copper or copper alloy deposition composition. Such a redox couple is particularly useful, if reverse pulse plating is used in combination with inert anodes for copper deposition. Suitable processes for copper plating using a redox couple in combination with reverse pulse plating and inert anodes are for example disclosed in U.S. Pat. Nos. 5,976,341 and 6,099,711.

The inventive method for electrolytic deposition of a metal or metal alloy layer, particularly of a copper or copper alloy layer, on at least one surface of a substrate comprises at least steps (i) as well as (ii) and step (iii). The steps are preferably carried out in the given order but not necessarily in immediate order. Steps (ii) and step (iii) may be carried out at the same time, subsequently or step (ii) is carried out followed by step (iii) while step (ii) is continued.

The method optionally comprises further steps in-between the named steps such as rinsing, drying or pretreatment steps which are known in the art. By carrying out the inventive method for deposition of a metal or metal alloy layer, particularly of a copper or copper alloy layer, on at least one surface of a substrate, a metal or metal alloy layer, preferably a copper or copper alloy layer, is deposited on the at least one surface of the substrate.

In step (i) of the inventive method for electrolytic deposition of a metal or metal alloy layer on at least one surface of a substrate, a substrate having the at least one surface is provided. Any substrate may be used in the method according to the invention. Typical substrates are conductive and semi-conductive substrates. Conductive substrates are metallic substrates including metallic seed layers as well (e.g. palladium deposited on a typical non-conductive substrate such as plastics to make the latter receptive for metal plating); semi-conductive substrates are exemplarily silicon and glass substrates. The substrate has at least one surface suitable to be treated with the inventive metal or metal alloy deposition composition. The substrates are made in their entirety of the materials listed above or they only comprise one or more surfaces made of the materials listed above. It is also possible within the meaning of the present invention to treat more than one surface simultaneously or subsequently.

Preferably, the substrate is selected from the group consisting of printed circuit boards, IC substrates, circuit carriers, interconnect devices, semiconducting wafers, glass substrates and suitable precursors for any of the aforementioned such as copper clad laminates or copper foils. More preferred are substrates of the aforementioned group which have one or more recessed structures such as trenches, blind micro vias, through silicon vias and through glass vias. The metal or metal alloy, preferably the copper or copper alloy, is then deposited into the recessed structures.

Optionally, the at least one substrate is subjected to one or more pre-treatment steps. Pre-treatment steps are known in the art. The pre-treatment steps can be for example cleaning steps, (micro-) etching steps and activation steps. Cleaning steps typically use aqueous solutions comprising one or more surfactants and are used to remove contaminants, e.g. from the at least one surface of the substrate which are detrimental to the metal or metal alloy deposition composition. (Micro-) Etching steps usually employ acidic solutions, optionally comprising one or more oxidant such as hydrogen peroxide, to increase the surface area of the at least one surface of the substrate. Activation steps usually require the deposition of a metal catalyst, most often palladium, on the at least one surface of the at least one substrate to render said at least one surface more receptive for metal deposition. Sometimes an activation step is preceded by a pre-dip step or succeeded by a post-dip step, both of which are known in the art. Such pre-treatment steps are usually included in the inventive method prior to steps (ii) and/or (iii).

In step (ii) of the inventive method for electrolytic deposition of a metal or metal alloy layer, the at least one surface of the substrate is contacted with the metal or metal alloy deposition composition according to the invention. The substrate or at least a portion of the surface may be contacted with the inventive metal or metal alloy deposition composition by means of spraying, wiping, dipping, immersing or by other suitable means. Thereby, a metal or metal alloy layer, preferably a copper or copper alloy layer, is obtained on at least a portion of the surface of the substrate.

For this purpose, the metal or metal alloy deposition composition according to the invention is operated from 10 to 100° C. for any duration sufficient to electrolytically deposit the desired deposit thickness. Suitable temperatures and durations can be determined by the person skilled in the art by routine experiments.

The metal or metal alloy deposition composition can for example be used in conventional vertical or horizontal plating equipment. Alternatively, fountain plating equipment may be used.

It is preferential to agitate the metal or metal alloy deposition composition or the substrate during the plating process, i.e. the deposition of the metal or metal alloy layer. Agitation may be accomplished for example by mechanical movement of the metal or metal alloy deposition composition like shaking, rotation, stirring; by mechanical movement of the substrate in the metal or metal alloy deposition composition such as rotation thereof or by continuously pumping of the liquids or by ultrasonic treatment, elevated temperatures or gas feeds (such as purging the metal or metal alloy deposition composition with air or an inert gas such as argon or nitrogen).

By applying step (iii) in the method according to the invention, the inventive metal or metal alloy deposition composition can be used for DC plating and (reverse) pulse plating. The person skilled in the art can select useful current densities for this purpose by routine experiments. Both inert and soluble anodes can be utilized when depositing the metal or metal alloy from the inventive metal or metal alloy deposition composition.

The preferred electrolytic copper or copper alloy deposition composition is preferably operated in the method according to the present invention in a temperature range of 15° C. to 50° C., more preferably in a temperature range of 20° C. to 40° C. by applying an electrical current to the substrate and at least one anode. Preferably, a cathodic current density range of 0.05 A/dm² to 12 A/dm², more preferably 0.1 A/dm² to 7 A/dm² is applied.

Preferably, pure copper is deposited (disregarding any trace impurities commonly present in technical raw materials). Pure copper is particularly useful in the semiconductor industry due to its high conductivity. Pure copper shall be understood in the context of the present invention that a minimum copper content of preferably 99 wt.-%, more preferably 99.9 wt.-%. In a more preferred embodiment, the deposits formed preferably consist of at least 99 wt.-% copper, more preferably at least of 99.9 wt.-% copper.

It is an advantage of the present invention that in particular the electrolytic copper or copper alloy deposition composition allows for uniform filling of recessed structures and that the formed copper deposits are free of voids. Uniform filling is to be understood in the context of the present invention that different recessed structures having different diameter to depth aspect ratios such as trenches which generally have a depth to diameter aspect ratio of ≥1 and vias generally which have a depth to diameter aspect ratio of <1 can be filled in one step resulting in similar layer distribution in these different recessed structures having different aspect ratios.

Further advantageously, dimples of formed deposits in recessed structures having depth to diameter aspect ratios of 0.6 or greater, in particular such having had depth to diameter aspect ratios of 0.6 to 1.0, prior to said deposition are much less pronounced (e.g. at reduced copper thickness) than those obtained by methods and from compositions known in the prior art.

It is a further advantage of the present invention that in particular the copper or copper alloy deposition composition allows for optimal mounding results to be obtained. Mounding means in this context that a planar copper or copper alloy deposit can be obtained that does neither show any (substantial) dimples nor any (substantial) overburdens.

The present invention further concerns a method for preparation of a plating compound according to the invention, comprising the steps
(A) providing at least one imidazole compound represented by formula (IM)

wherein $R^{IM}$ is selected from the group consisting of hydrogen and alkyl group;
(B) treating the imidazole compound with a base suitable to abstract a hydrogen ion from the imidazole compound
such that an anionic imidazole compound is formed;
(C) reacting said anionic imidazole compound with at least one first dielectrophile selected from the group consisting of
a compound represented by formula (D1)

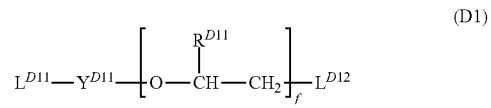

wherein
$Y^{D11}$ is an alkanediyl group;
each $R^{D11}$ is independently selected from the group consisting of hydrogen, alkyl group, aryl group and alkaryl group;
$L^{D11}$ and $L^{D12}$ are independently leaving groups suitable to be replaced by nucleophilic substitution;
f is an integer ranging from 1 to 10;
a compound represented by formula (D2)

wherein
$Y^{D21}$ is an alkanediyl group;
$L^{D21}$ is a leaving group suitable to be replaced by nucleophilic substitution;
a compound represented by formula (D3)

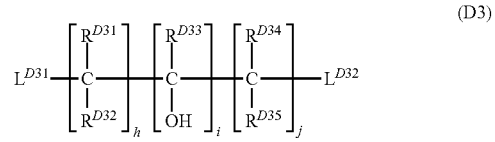

wherein
$R_{D31}$, $R^{D32}$, $R^{D33}$, $R^{D34}$ and $R^{D35}$ are independently selected from the group consisting of hydrogen, alkyl group, aryl group and alkaryl group;
$L^{D31}$ and $L^{D32}$ are independently leaving groups suitable to be replaced by nucleophilic substitution;

h is an integer selected from 1, 2, 3, 4, 5 and 6;
i is an integer selected from 1 and 2;
j is an integer selected from 1, 2, 3, 4, 5 and 6;
and
a compound represented by formula (D4)

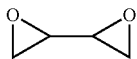
(D4)

and thereby forming an intermediate; and
(D) reacting said intermediate with at least one second dielectrophile selected from the group consisting of
a compound represented by formula (E1)

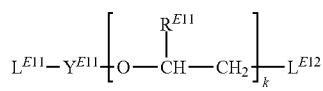
(E1)

wherein
$Y^{E11}$ is an alkanediyl group;
$R^{E11}$ is independently selected from the group consisting of hydrogen, alkyl group, aryl group and alkaryl group;
$L^{E11}$ and $L^{E12}$ are independently leaving groups suitable to be replaced by nucleophilic substitution;
k is an integer ranging from 1 to 10;
a compound represented by formula (E2)

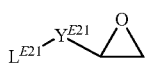
(E2)

wherein
$Y^{E21}$ is an alkanediyl group;
$L^{E21}$ is a leaving group suitable to be replaced by nucleophilic substitution;
a compound represented by formula (E3)

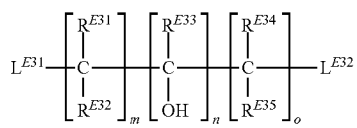
(E3)

wherein
$R_{E31}$, $R^{E32}$, $R^{E33}$, $R^{E34}$ and $R^{E35}$ are independently selected from the group consisting of hydrogen, alkyl group, aryl group and alkaryl group;
$L^{E31}$ and $L^{E32}$ are independently leaving groups suitable to be replaced by nucleophilic substitution;
m is an integer selected from 1, 2, 3, 4, 5 and 6;
n is an integer selected from 1 and 2;
o is an integer selected from 1, 2, 3, 4, 5 and 6;

and
a compound represented by formula (E4)

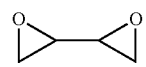
(E4)

with the proviso that the first dielectrophile is selected from a compound represented by formula (D1) and/or the second dielectrophile is selected from a compound represented by formula (E1); and thereby forming the at least one plating compound.

Compounds represented by both formulae (D1) and (E1) result in structural units represented by formula (X-1) to be included in the plating additive while compounds represented by formulae (D2), (D3), (D4), (E2), (E3) and (E4) give structural units represented by formula (X-2).

Preferably, the first dielectrophile is a compound represented by formula (D1) and the second dielectrophile is a compound represented by formula (E1). Such plating compounds are particularly useful in metal or metal alloy deposition composition, and particularly in copper or copper alloy deposition compositions to solve above described objectives.

In one embodiment of the present invention, the first dielectrophile is a compound represented by formula (D1) or the second dielectrophile is a compound represented by formula (E1) while the other dielectrophile is selected from a compound represented by (D2), a compound represented by (D3) and a compound represented by (D4) or is selected from a compound represented by (E2), a compound represented by (E3) and a compound represented by (E4), respectively. It is clear that the listed compounds and intermediates in the method for preparation of the plating compound result when used in said method in the formation of the plating compound.

The steps are preferably carried out in the given order but not necessarily in immediate order. Further steps such as drying, purification and so forth may be included in-between the steps of above method.

In step (A), the at least one imidazole compound represented by formula (IM) is provided. Preferably, $R^{IM}$ is preferably selected from the group consisting of hydrogen and C1-C4-alkyl group, more preferably from hydrogen and C1-C2-alkyl group.

In step (B), the at least one imidazole compound represented by formula (IM) is treated with a base suitable to abstract a hydrogen ion from said imidazole compound. As a result, an anionic imidazole compound is formed. This anionic imidazole compound may exemplarily be represented as

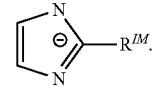

It is also possible that the abstraction of the hydrogen ion is an equilibrium reaction. The imidazole compound obtained in such an equilibrium reaction is also included in the term "anionic imidazole compound" in the context of the invention. Preferably, the abstraction of the hydrogen ion is complete as this results in faster reaction times and improved yields.

Any base suitable for above purpose may be used. The person skilled in the art can select such bases inter alia based on the respective $pK_a$ values of the imidazole compound and pK$_b$ values of the base. Useful bases include hydroxides; alkoxides; hydrides; salts and mixtures of the aforementioned. Hydroxides in this context are in particular alkaline hydroxides such as lithium hydroxide, sodium hydroxide, potassium hydroxide. Alkoxides are preferably methoxides and ethoxides and their respective alkaline salts (e.g. LiOMe, NaOMe, KOEt). Particularly useful hydrides are alkaline hydrides such as sodium and potassium hydride.

The optimal molar ratio of the base in respect to the imidazole compound depends on various factors such as the respective pK$_a$ values of the imidazole compound and pK$_b$ values of the base. In one embodiment of the present invention, the molar ratio of the base in respect to the imidazole compound ranges from 1 to 2, preferably from 1 to 1.5 and more preferably from 1 to 1.2.

Molar ratios below above thresholds may result in incomplete conversions of the imidazole compound while higher ratios may be applicable but do not result in any beneficial aspects but increase the cost.

In step (B), at least one solvent is preferably being used to facilitate said hydrogen ion abstraction. The at least one solvent is preferably a polar solvent. More preferably, the at least one solvent is selected from the group consisting of N,N-dimethylformamide (DMF), Dimethylacetamide (DMAc), dimethylsulfoxide (DMSO), polar alcohols such as methanol and ethanol and mixtures of the aforementioned.

In one embodiment of the present invention, the imidazole compound is dissolved in at least one solvent prior to step (B). Then, the base is fed to the imidazole compound in the at least one solvent. Alternatively, the base is dissolved in the at least one solvent and the imidazole compound is added to said base in the at least one solvent.

The optimum temperature during step (B) ranges from 30 to 120° C., preferably from 40 to 110° C. and more preferably from 50 to 100° C.

Any time necessary to allow for a substantial hydrogen ion abstraction may be used. Typical times thereof range from 0.1 to 10 h, preferably from 0.25 to 5 h and more preferably from 0.5 to 3 h.

In step (C), said anionic imidazole compound is reacted with at least one first dielectrophile selected from compounds represented by any one of formulae (D1) to (D4). The at least one first dielectrophile selected from compounds represented by any one of formulae (D1) to (D4) is hereinafter referred to as "first dielectrophile". Compounds represented by any one of formulae (D1), (D2) and (D3) are preferred. More preferred are compounds represented by any one of formulae (D1) and (D2). Most preferred are compounds represented by formula (D1). By conducting this reaction, an intermediate is formed. If a compound represented by formula (D1) is used in step (C), an intermediate having a structural unit represented by formula (X-1) is obtained. In all other cases, an intermediate comprising a structural unit represented by formula (X-2) is formed.

L$^{D11}$, L$^{D12}$, L$^{D21}$, L$^{D31}$ and L$^{D32}$ are independently leaving groups suitable to be replaced by nucleophilic substitution. The person skilled in the art is aware of such leaving groups and they are widely used in organic chemistry. Exemplarily, useful leaving groups are independently selected from alkylsulfonate such as methanesulfonate (also known as mesylate), triflate, nonaflate; arylsulfonate such as toluenesulfonate; halide such as chloride, bromide, iodide; and methanesulfate (CH$_3$—O—SO$_3^-$). More preferably, the respective leaving group is independently selected from the group consisting of alkylsulfonate, arylsulfonate and halide.

Preferably, Y$^{D11}$ is a C1-C12-alkanediyl group; Y$^{D11}$ is more preferably a C2-C6-alkanediyl group; Y$^{D11}$ is even more preferably a C2-C4-alkanediyl group; Y$^{D11}$ is yet even more preferably 1,2-ethandiyl or 1,3-propanediyl.

Preferably, R$^{D11}$ is selected from the group consisting of hydrogen, C1-C4-alkyl group and phenyl group; R$^{D11}$ is more preferably selected from the group consisting of hydrogen and C1-C2-alkyl group; R$^{D11}$ is even more preferably selected from the group consisting of hydrogen and methyl group; most preferably, R$^{11}$ is hydrogen.

Typically, Y$^{D21}$ is selected to allow a structural unit represented by formula (X-2) to be obtained.

Preferably, Y$^{D21}$ is

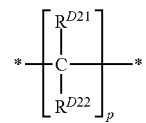

wherein R$^{D21}$ and R$^{D22}$ are independently selected from the group consisting of hydrogen, alkyl group, aryl group and alkaryl group; R$^{D21}$ and R$^{D22}$ are preferably selected from the group consisting of hydrogen and C1-C4-alkyl group; R$^{D21}$ and R$^{D22}$ are more preferably selected from the group consisting of hydrogen and C1-C2-alkyl group; R$^{D21}$ and R$^{D22}$ are even more preferably selected from the group consisting of hydrogen and methyl group; most preferably RD$^{21}$ and R$^{D22}$ are hydrogen. p is an integer selected from 1, 2, 3, 4, 5 and 6; p is preferably selected from 1, 2 and 3; p is more preferably selected from 1 and 2; even more preferably, p is 1. Most preferably, the compound represented by formula (D2) is an epihalohydrin such as epichlorohydrin or epibromohydrin.

R$^{D31}$, R$^{D32}$, R$^{D33}$, R$^{D34}$ and R$^{D35}$ are preferably selected from the group consisting of hydrogen and C1-C4-alkyl group; R$^{D31}$, R$^{D32}$, R$^{D33}$, R$^{D34}$ an d R$^{D35}$ are more preferably selected from the group consisting of hydrogen and C1-C2-alkyl group; R$^{D31}$, R$^{D32}$, R$^{D33}$, R$^{D34}$ and R$^{D35}$ are even more preferably selected from the group consisting of hydrogen and methyl group; most preferably, R$^{D31}$, R$^{D32}$, R$^{D33}$, R$^{D34}$ and R$^{D35}$ are hydrogen.

Preferably, integer h is selected from 1, 2 and 3; h is more preferably selected from 1 and 2; even more preferably, h is 1.

In case, integer i is 2, both carbon atoms bearing the hydroxyl groups are adjacent, thus forming a vicinal diol. Preferably, i is 1.

Preferably, integer j is selected from 1, 2 and 3; more preferably selected from 1 and 2; even more preferably j is 1.

In one embodiment of the present invention, the molar ratio of the anionic imidazole compound in respect to the first dielectrophile ranges from 1.8:1 to 2.5:1; it more preferably ranges from 1.9:1 to 2.25:1; even more preferably, it ranges from 1.95:1 to 2.1:1.

Preferably, the reaction in step (C) is carried out in at least one solvent. Preferable solvents are polar solvents, more preferably selected from water, glycols, acetonitrile and alcohols or mixtures thereof, water being most preferred for its ecologically benign character.

The optimum temperature during step (C) ranges from 20 to 120° C., preferably from 40 to 110° C. and more preferably from 60 to 100° C.

Any time necessary to allow for a substantial reaction of the anionic imidazole compound with the first dielectrophile in step (C) may be used. Typical times for said purpose were found to range from 1 to 70 h, preferably from 5 to 60 h and more preferably from 10 to 50 h.

In step (D), the intermediate is reacted with at least one second dielectrophile selected from compounds represented by any one of formulae (E1) to (E4). Compounds represented by any one of formulae (E1), (E2) and (E3) are preferred. More preferred are compounds represented by any one of formulae (E1) and (E2). Most preferred are compounds represented by formula (E1).

$L^{E11}$, $L^{E12}$, $L^{E21}$, $L^{E31}$ and $L^{E32}$ are independently leaving groups suitable to be replaced by nucleophilic substitution. The person skilled in the art is aware of such leaving groups and they are widely used in organic chemistry. Exemplarily, useful leaving groups are independently selected from alkylsulfonate such as methanesulfonate (also known as mesylate), triflate, nonaflate; arylsulfonate such as toluenesulfonate; halide such as chloride, bromide, iodide; and methanesulfate ($CH_3$—O—$SO_3^-$). More preferably, the respective leaving group is selected from the group consisting of alkylsulfonate, arylsulfonate and halide.

Preferably, $Y^{E11}$ is a C1-C12-alkanediyl group, more preferably a C2-C6-alkanediyl group, even more preferably a C2-C4-alkanediyl group, yet even more preferably 1,2-ethandiyl or 1,3-propanediyl.

Preferably, $R^{E11}$ is selected from the group consisting of hydrogen, C1-C4-alkyl group and phenyl group; $RE^{11}$ is more preferably selected from the group consisting of hydrogen and C1-C2-alkyl group; $R^{E11}$ is even more preferably selected from the group consisting of hydrogen and methyl group; most preferably, $R^{E11}$ is hydrogen.

Preferably, integer k ranges from 1 to 6; k more preferably ranges from 1 to 5; k even more preferably ranges from 2 to 4.

Typically, $Y^{E21}$ is selected to allow a structural unit represented by formula (X-2) to be obtained.

Preferably, $Y^{E21}$ is

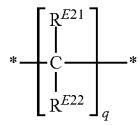

wherein $R^{E21}$ and $R^{E22}$ are independently selected from the group consisting of hydrogen, alkyl group, aryl group and alkaryl group; preferably, $R^{E21}$ and $R^{E22}$ are selected the group consisting of hydrogen and C1-C4-alkyl group; $R^{E21}$ and $R^{E22}$ are more preferably selected from the group consisting of hydrogen and C1-C2-alkyl group; $R^{E21}$ and $R^{E22}$ are even more preferably selected from the group consisting of hydrogen and methyl group; most preferably, $R^{E21}$ and $R^{E22}$ are hydrogen. Integer q is an integer selected from 1, 2, 3, 4, 5 and 6; q is preferably selected from 1, 2 and 3; q is more preferably selected from 1 and 2; even more preferably, q is 1. Most preferably, the compound represented by formula (E2) is an epihalohydrin such as epichlorohydrin or epibromohydrin.

$R^{E31}$, $R^{E32}$, $R^{E33}$, $R^{E34}$ and $R^{E35}$ are preferably selected from the group consisting of hydrogen and C1-C4-alkyl group; $R^{E31}$, $R^{E32}$, $R^{E33}$, $R^{E34}$ and $R^{E35}$ are more preferably selected from the group consisting of hydrogen and C1-C2-alkyl group; $R^{E31}$, $R^{E32}$, $R^{E33}$, $R^{E34}$ and $R^{E35}$ are even more preferably selected from the group consisting of hydrogen and methyl group; most preferably, $R^{E31}$, $R^{E32}$, $R^{E33}$, $R^{E34}$ and $R^{E35}$ are hydrogen.

Preferably, integer m is selected from 1, 2 and 3; m is more preferably selected from 1 and 2; even more preferably, m is 1.

In case, integer n is 2, both carbon atoms bearing the hydroxyl groups are adjacent, thus forming a vicinal diol. Preferably, n is 1.

Preferably, integer o is selected from 1, 2 and 3; o is more preferably selected from 1 and 2; even more preferably, o is 1.

The molar ratio of the intermediate in respect to the second dielectrophile may be altered in wide ranges. In one embodiment of the present invention, the molar ratio of the intermediate in respect to the second dielectrophile ranges from 1:1 to 1.5:1, more preferably it ranges from 1.04:1 to 1.4:1, even more preferably, it ranges from 1.05:1 to 1.25:1.

The temperature in step (D) usually ranges from 50 to 100° C., preferably from 60 to 90° C., more preferably from 75 to 85° C.

The reaction in step (D) is typically carried out until a sufficient conversion of the intermediate is reached. Usually, 1 to 120 h, preferably 8 to 80 h, more preferably 14 to 60 h, are sufficient for said purpose.

It is possible to carry out one or more of steps (B), (C) and/or (D) in an inert atmosphere (e.g. in a nitrogen atmosphere).

INDUSTRIAL APPLICABILITY

The present invention is particularly useful in the electronics industry, e.g. for manufacturing of printed circuit boards in general and in particular in the production of high density interconnect (HDI) printed circuit boards, especially by filling recessed structures as blind micro vias (BMVs) having an depth to diameter aspect ratio of 0.6 or greater, much preferred recessed structures having such aspect ratios of 0.6 to 1.0. In one embodiment the substrate of the (HDI) printed circuit boards, having recessed structures as vertical BMVs, are bendable and foldable substrates. Other uses include the decorative metallization of surfaces.

EXAMPLES

The invention will now be illustrated by reference to the following non-limiting examples.

Commercial products were used as described in the technical datasheet available on the date of filing of this specification unless stated otherwise hereinafter.

$^1$H-NMR spectra were recorded at 400 MHz with a spectrum offset of 4300 Hz, a sweep width of 9542 Hz at 25° C. (NMR spectroscope provided by Bruker Corp.). The solvent used was $d^6$-DMSO unless stated otherwise.

The weight average molecular mass (Mw) of the plating compounds was determined by gel permeation chromatography (GPC) using the following GPC apparatus and conditions: SECurity GPC System PSS, pump: Agilent 1260, column: Tosoh TSK Gel G2500 PWXL and TSK Gel G3000 PWXL, 30° C., Eluent 0.1 mol/L NaCl with 0.1% formic acid in water-acetonitrile (65:35 v/v), flow: 1 mL/min, detector RI 30° C., time: 30 minutes, injection volume: 50 microliter, calibration: PEG Calibration (106-44000 g/mol) PSS standards, data system: WIN GPC V8.0.

The deposit thickness was measured at 10 positions of each substrate and was used to determine the layer thickness by XRF using the XRF instrument Fischerscope XDV-SDD (Helmut Fischer GmbH, Germany). By assuming a layered structure of the deposit, the layer thickness can be calculated from such XRF data.

Preparation Example of a Compound According to Formula (D1)

3360 mL dichloromethane was filled in a reaction reactor followed by 336 g PEG 200. Then, 395 g triethylamine was added continuously while the mixture was cooled to 4° C. 428 g methane sulfonic acid chloride was added in 210 min and the temperature was kept between 0 and 7° C. The resulting suspension was stirred for further 15 h. Thereafter, 500 ml water was added. The phases were separated and the organic phase was washed 5 more times with 500 mL water each. The solvent of the organic phase was then removed by distillation. The respective compound according to formula (D1) was obtained as a pale yellow liquid (614.8 g).

$^1$H NMR (400 MHz, Deuterium Oxide) δ 4.53-4.44 (m, 4H), 3.94-3.83 (m, 4H), 3.79-3.69 (m, 9H), 3.24 (5, 5H).

Preparation of Plating Compound A 450 mL water were filled in a flask, and then 16.93 g (1.08 equivalent (eq)) sodium hydroxide was added in portions. Once a homogenous solution was formed, 40.7 g 2-Ethylimidazole (1 eq) as imidazole compound was used (step (A)) and it was added to above solution in several individual portions. Then, the mixture was heated to 80° C. and kept 1 h at this temperature. A clear yellow solution formed. The water was removed under reduced pressure and the crude product was dried in high vacuum at 95° C. The respective anionic imidazole compound was obtained as yellow solid in quantitative yield (step (B)).

Of said yellow solid, 8.0 g (2.05 eq) were dissolved in 90 ml DMF under nitrogen atmosphere. Then, 6.14 g (1 eq) 1,2-Bis-(2-chlorethoxy)ethane were added in one portion and the mixture was heated to 70° C. for 48 h. A brown suspension formed. The formed precipitate was removed by filtration and washed with 50 ml DMF prior to removal of the solvent of the clear filtrate under reduced pressure (95° C., <5 mbar). The respective intermediate was obtained as orange oil in quantitative yield (step (C)).

$^1$H NMR (400 MHz, DMSO-d$_6$) δ 7.01 (d, J=1.1 Hz, 2H), 6.72 (d, J=1.1 Hz, 2H), 3.98 (t, J=5.3 Hz, 4H), 3.59 (t, J=5.3 Hz, 4H), 3.42 (d, J=5.7 Hz, 4H), 2.61 (q, J=7.5 Hz, 4H), 1.25-1.12 (m, 6H).

Then, 2.67 g of the intermediate was dissolved in 5 ml water. Afterwards, 2.33 g of the product obtained from above Preparation Example of a compound according to formula (D1) was added and the mixture was stirred for 47 h at 80° C. 10.0 g of a yellow solution (50 wt.-% in water) containing plating compound A was obtained (step (D)).

The resulting plating compound A was a plating compound represented by formula (2) wherein $R^1$, $R^2$, $R^3$, $R^4$ are ethyl groups, $X^1$ and $X^3$ are

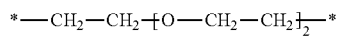

and $X^2$ is

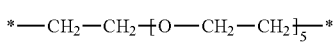

$^1$H NMR (400 MHz, DMSO-d$_6$) δ 7.73 (dddd, J=7.9, 6.7, 3.3, 1.7 Hz, 2H), 7.36-7.26 (m, 1H), 7.19-7.09 (m, 1H), 4.34 (h, J=6.1, 5.2 Hz, 8H), 4.21-4.10 (m, 2H), 3.82-3.69 (m, 8H), 3.71-3.59 (m, 2H), 3.61-3.35 (m, 14H), 3.13-3.02 (m, 4H), 2.86-2.71 (m, 2H), 2.38-2.28 (m, 2H), 2.33 (5, 6H), 1.30-1.13 (m, 4H), 1.18 (m, 6H).

$M_w$=1100 g/mol

Preparation of Plating Compound B

Following the method described for plating compound A, plating compound B was synthesized with the following modifications:

2-methylimidazole was used in step (A) instead of 2-ethylimidazole

The resulting plating compound B was a plating compound represented by formula (2) wherein $R^1$, $R^2$, $R^3$, $R^4$ are methyl groups, $X^1$ and $X^3$ are

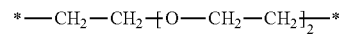

and $X^2$ is

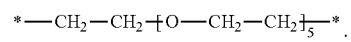

$^1$H NMR (400 MHz, Deuterium Oxide) δ 7.46-7.25 (m, 3H), 7.10 (d, J=1.8 Hz, 1H), 7.00-6.88 (m, 1H), 4.25 (dp, J=14.6, 4.9 Hz, 7H), 4.09 (h, J=7.6 Hz, 2H), 3.88-3.67 (m, 9H), 3.67-3.46 (m, 14H), 2.71 (s, 6H), 2.60-2.45 (m, 5H), 2.37 (q, J=2.4, 1.5 Hz, 2H).

$M_w$=1500 g/mol

Preparation of Plating Compound C

Following the method described for plating compound A, plating compound C was synthesized with the following modifications:

imidazole was used in step (A) instead of 2-ethylimidazole 1,3-dichloropropane-2-ol was used in step (D) instead of the product obtained from above preparation example of a compound according to formula (D1)

The resulting plating compound C was a plating compound represented by formula (2) wherein $R^1$, $R_2$, $R^3$, $R^4$ are ethyl groups, $X^1$ and $X^3$ are

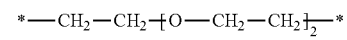

and $X^2$ is

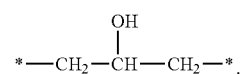

Plating compound C thus contained a structural unit represented by formula (X-1) and a structural unit represented by formula (X-2).

$^1$H NMR (400 MHz, DMSO-d$^6$) δ 9.53-9.31 (m, 8H), 7.86 (td, J=27.9, 27.0, 9.3 Hz, 16H), 7.77-7.72 (m, 3H), 7.29-7.14 (m, 3H), 6.92 (s, 3H), 4.65-4.46 (m, 9H), 4.39 (m, 19H), 4.34-4.18 (m, 13H), 4.12 (m, 7H), 3.76 (m, 23H), 3.69-3.59 (m, 9H), 3.48 (m, 11H).

$M_w$=2400 g/mol

Preparation of Plating Compound D

Following the method described for plating compound C, plating compound D was synthesized with the following modifications:

1-chloro-2-(2-chloroethoxy)ethane was used in step (D) instead of 1,3-dichloropropane-2-ol The resulting plating compound D was a plating compound represented by formula (2) wherein $R^1, R^2, R^3, R^4$ are ethyl groups, $X^1$ and $X^3$ are

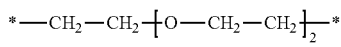

and $X^2$ is
*—$CH_2$—$CH_2$—O—$CH_2$—$CH_2$—*.
$^1H$ NMR (400 MHz, DMSO-$d_6$) δ 9.83-9.37 (m, 8H), 8.03-7.80 (m, 16H), 7.77 (d, J=6.0 Hz, 4H), 7.28-7.17 (m, 3H), 6.94 (s, 3H), 4.45 (m, 34H), 4.13 (m, 13H), 3.79 (m, 34H), 3.69-3.56 (m, 9H), 3.52-3.39 (m, 12H).
$M_w$=2000 g/mol Preparation of Plating Compound E Following the method described for plating compound A, plating compound E was synthesized with the following modifications:

Triethyleneglycol dimesylate (also named 2,2'-[1,2-Ethanediylbis(oxy)]bis-ethanol 1,1'-dimethanesulfonate) was used in step (D) instead of the product obtained from preparation example of a compound according to formula (D1)

The resulting plating compound E is a plating compound represented by formula (2) wherein $R^1, R^2, R^3, R^4$ are ethyl groups, $X^1$, $X^2$ and $X^3$ are

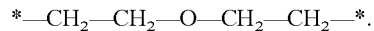

$^1H$ NMR (400 MHz, DMSO-$d_6$) δ 7.81-7.54 (m, 3H), 4.34 (m, 6H), 4.12 (m, 2H), 3.85-3.69 (m, 7H), 3.69-3.59 (m, 2H), 3.59-3.32 (m, 15H), 3.15-2.96 (m, 3H), 2.76 (m, 2H), 2.34 (s, 6H), 1.20 (m, 8H).
$M_w$=1200 g/mol General Method For Application Examples Equipment: Mini sparger cell with 1.8 L volume, bath agitation with a pump, no air injection, insoluble anodes.

The test panels used as substrates throughout the application examples comprised BMVs (blind microvias, diameter×depth: 125×75 μm, depth to diameter aspect ratio: 0.6 and diameter×depth: 100×75 μm, depth to diameter aspect ratio: 0.75). The size of the test panels was 7.5×10 cm and had an electroless copper layer as outer layer (deposited from a commercial bath: Printoganth™ PV, provided by Atotech Deutschland GmbH, Germany, 0.5 to 2 μm) whereon the deposition was to be carried out. The test panels were cleaned and rinsed prior to their usage.

A stock solution comprising 60 g/L $Cu^{2+}$ ions (added as copper sulfate), 50 g/L sulfuric acid, 45 mg/L $Cl^-$ ions, 300 mg/L polyethylene glycol (10,000 g/mol) as suppressor and 1.4 mL/L of Cupracid® S3 Brightener (product of Atotech Deutschland GmbH, a solution containing an standard sulfur-organic accelerator) was used. The levelers were added to said stock solution in concentrations as given below.

Then, the test panels were immersed into the stock solution containing the leveler (hereinafter: "deposition solution"). A current density of 1.5 A/dm² was applied throughout all application examples. The thickness of copper layer deposited onto the surface of the test panels was in average 12 μm. The duration of the deposition was adjusted accordingly.

After the copper deposition was complete, the test panels were subjected to the following test method: A sufficient BMV filling with copper means that the copper deposit has no or almost no so-called dimple. An insufficient BMV filling is characterized by a concave structure of the copper deposit, i.e. by a dimple. Hence, the copper surface of a sufficiently filled BMV is as even as possible. Voids in a copper filled via are also not desired. Industrial processes require dimples to be as small as possible.

The cross sections of recessed structures filled with copper were investigated with an optical microscope after depositing a protection layer of nickel onto the copper deposit and applying conventional grinding and polishing methods. The values for the "dimples" were recorded with a chromatic sensor (Nanofocus p-scan with sensor CRT5).

Comparative Examples C1 to C10

Following the General Method for Application Examples outlined above, the following levelers known from the prior art were used in concentrations as given below.

a) Raluplate IME, a reaction product of epichlorohydrine and imidazole, obtained from Raschig GmbH, Germany b) the compound as described in Example 1 of WO 2011/151785 A1:

This compound comprised a 1,4-butanediyl moiety between the imidazole moieties ($M_w$=5000 g/mol).

The results are summarized in the following table.

TABLE 1

| | Comparative examples (BMV filling capability) | | | |
|---|---|---|---|---|
| # | Plating compound | c [mg/L] | Dimple [μm] in 125 × 75 μm BMVs | Dimple [μm] in 100 × 75 μm BMVs |
| C1 | Raluplate IME | 1 | 75 | 75 |
| C2 | Raluplate IME | 5 | 75 | 75 |
| C3 | Raluplate IME | 10 | 75 | 75 |
| C4 | Raluplate IME | 20 | 75 | 75 |
| C5 | Raluplate IME | 100 | 75 | 75 |
| C6 | Example 1 of WO 2011/151785 A1 | 1 | 75 | 75 |
| C7 | Example 1 of WO 2011/151785 A1 | 5 | 75 | 75 |
| C8 | Example 1 of WO 2011/151785 A1 | 10 | 75 | 75 |
| C9 | Example 1 of WO 2011/151785 A1 | 20 | 75 | 75 |
| C10 | Example 1 of WO 2011/151785 A1 | 100 | 75 | 75 |

Irrespective of the compounds of the comparative examples and their concentrations used, the dimples of all depositions were identically high.

Inventive Examples 1 to 25

Following the general method for application examples outlined above, inventive plating compounds A to E were used as levelers in concentrations as given below. The results are summarized in the following table.

TABLE 2

Inventive application examples 1 to 25

| # | Plating compound | c [mg/L] | Dimple [μm] in 125 × 75 μm BMVs | Dimple [μm] in 100 × 75 μm BMVs |
|---|---|---|---|---|
| 1 | Plating compound A | 1 | 55 | 32 |
| 2 | Plating compound A | 5 | 10 | 5 |
| 3 | Plating compound A | 10 | 25 | 6 |
| 4 | Plating compound A | 20 | 4 | −3 |
| 5 | Plating compound A | 100 | 5 | −2 |
| 6 | Plating compound B | 1 | 55 | 40 |
| 7 | Plating compound B | 5 | 11 | 6 |
| 8 | Plating compound B | 10 | 6 | −3 |
| 9 | Plating compound B | 20 | 11 | 3 |
| 10 | Plating compound B | 100 | 11 | 3 |
| 11 | Plating compound C | 1 | 24 | 10 |
| 12 | Plating compound C | 5 | 20 | 12 |
| 13 | Plating compound C | 10 | 22 | 12 |
| 14 | Plating compound C | 20 | 24 | 15 |
| 15 | Plating compound C | 100 | 40 | 17 |
| 16 | Plating compound D | 1 | 25 | 12 |
| 17 | Plating compound D | 5 | 16 | 5 |
| 18 | Plating compound D | 10 | 14 | 7 |
| 19 | Plating compound D | 20 | 18 | 8 |
| 20 | Plating compound D | 100 | 25 | 11 |
| 21 | Plating compound E | 1 | 80 | 80 |
| 22 | Plating compound E | 5 | 15 | 10 |
| 23 | Plating compound E | 10 | 10 | 5 |
| 24 | Plating compound E | 20 | 8 | 2 |
| 25 | Plating compound E | 100 | 27 | 8 |

Blind micro vias (BMVs) having dimensions of 125×75 μm and 100×75 μm were filled with copper using deposition solutions containing the plating compounds A to E. The dimples obtained from the inventive deposition solutions were always less pronounced than those obtained in the comparative examples C1-C10 which is highly desired in the art. In particular, the deposition solutions containing Plating Compound A and Plating Compound B allowed for very small dimples of mostly approximately 10 μm or even of 5 μm or less to be obtained.

Other embodiments of the present invention will be apparent to those skilled in the art from a consideration of this specification or practice of the invention disclosed herein. It is intended that the specification and examples be considered as exemplary only, with the true scope of the invention being defined by the following claims only.

The invention claimed is:

1. A metal or metal alloy deposition composition, for electrolytic deposition of a metal or metal alloy layer, comprising
   a) at least one type of metal ions to be deposited,
   b) at least one plating compound comprising at least one structural unit represented by formula (1)

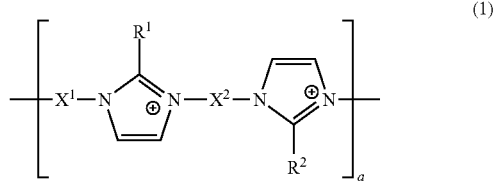

(1)

wherein
each $R^1$ and $R^2$ are independently selected from the group consisting of hydrogen and alkyl group;
each $X^1$ and $X^2$ are independently selected from the group consisting of
-a structural unit represented by formula (X-1)

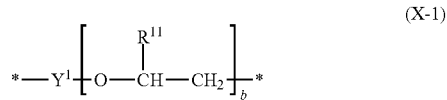

(X-1)

wherein
$Y^1$ is an alkanediyl group;
each $R^{11}$ is independently selected from the group consisting of hydrogen, alkyl group, aryl group, and alkaryl group;
b is an integer ranging from 1 to 10; and
-a structural unit represented by formula (X-2)

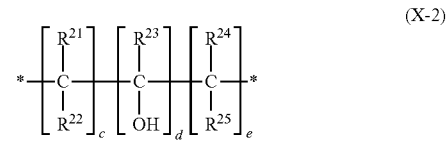

(X-2)

wherein $R^{21}$, $R^{22}$, $R^{23}$, $R^{24}$ and $R^{25}$ are independently selected from the group consisting of hydrogen, C1-C4-alkyl group;
c is an integer selected from 1, 2, 3, 4, 5 and 6;
d is an integer selected from 1 and 2;
e is an integer selected from 1, 2, 3, 4, 5 and 6;
with the proviso that at least one of $X^1$ and $X^2$ is a structural unit represented by formula (X-1);
and a is an integer ranging from 1 to 10.

2. The metal or metal alloy deposition composition of claim 1 characterized in that $R^1$ and $R^2$ are independently selected from the group consisting of hydrogen and C1-C4-alkyl group.

3. The metal or metal alloy deposition composition of claim 1 characterized in that $Y^1$ is a C1-C12-alkanediyl group.

4. The metal or metal alloy deposition composition of claim 1 characterized in that $R^{11}$ is selected from the group consisting of hydrogen, C1-C4-alkyl group and phenyl group.

5. The metal or metal alloy deposition composition of claim 1 characterized in that integer a ranges from 1 to 8.

6. The metal or metal alloy deposition composition of claim 1 characterized in that integer b ranges from 1 to 6.

7. The metal or metal alloy deposition composition of claim 1 characterized in that the plating compound is represented by formula (2)

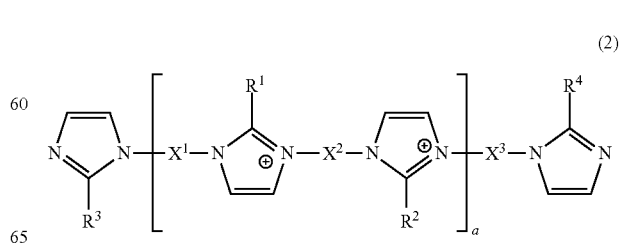

(2)

wherein

- $R^3$ and $R^4$ are independently selected from the group consisting of hydrogen and alkyl group; and
- $X^3$ is selected from the group consisting of a structural unit represented by formula (X-1) and a structural unit represented by formula (X-2).

8. The metal or metal alloy deposition composition of claim 1 characterized in that $X^1$ and $X^2$ are both structural units represented by formula (X-1).

9. The metal or metal alloy deposition composition of claim 8 characterized in that $X^1$ and $X^2$ are structurally different.

10. The metal or metal alloy deposition composition of claim 1 characterized in that a first one of $X^1$ or $X^2$ is a structural unit represented by formula (X-1) and a second one of $X^1$ or $X^2$ is a structural unit represented by formula (X-2).

11. The metal or metal alloy deposition composition of claim 1 wherein the composition is a copper or copper alloy deposition composition.

12. The metal or metal alloy deposition composition of claim 1 wherein $R^1$ and $R^2$ are independently selected from the group consisting of hydrogen and C1-C2-alkyl group.

13. The metal or metal alloy deposition composition of claim 1 wherein $Y^1$ is a C2-C6-alkanediyl group.

14. The metal or metal alloy deposition composition of claim 1 wherein R1 and R2 are independently selected from the group consisting of hydrogen and C1-C2-alkyl group and wherein Y1 is a C2-C6-alkanediyl group.

* * * * *